March 12, 1929.  W. S. GRAHAM  1,705,288
TRACTOR CULTIVATOR ATTACHMENT
Filed Jan. 24, 1927  2 Sheets-Sheet 1

Inventor
William S. Graham
By H.P. Doolittle
Atty.

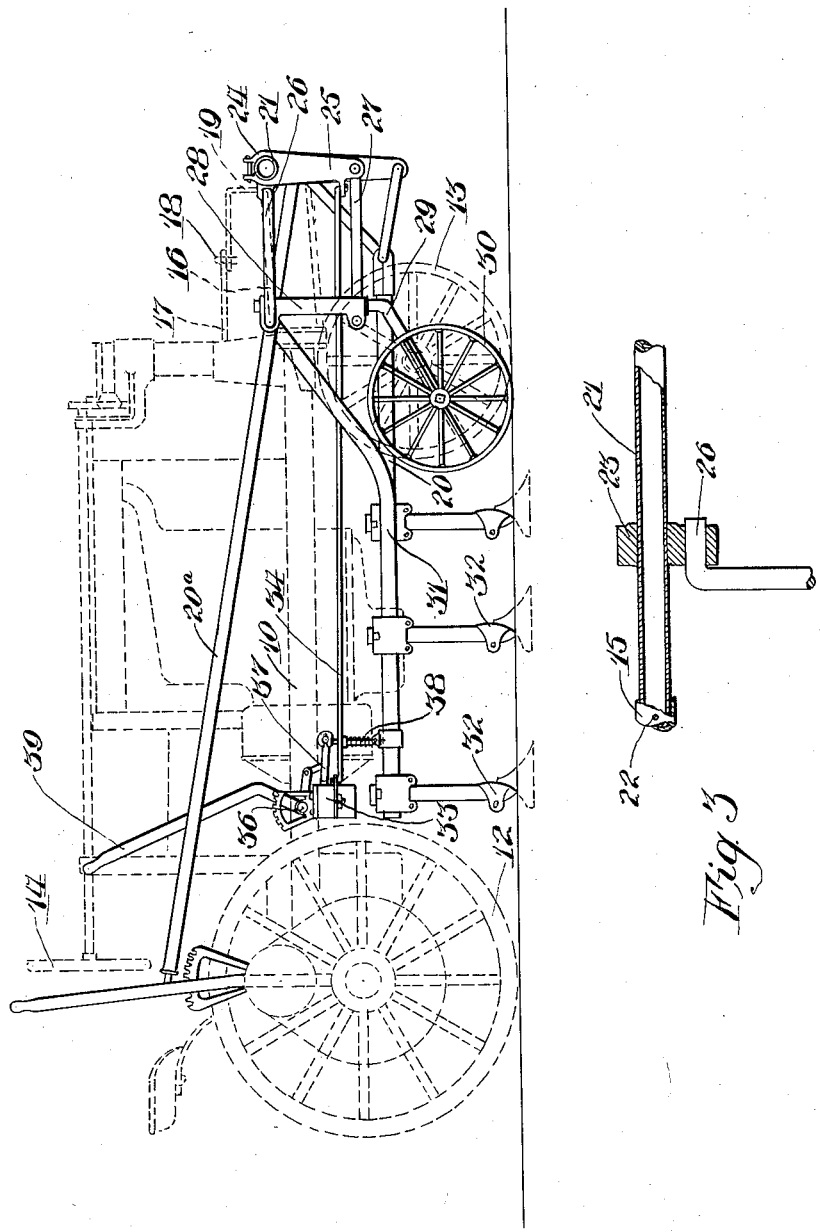

Patented Mar. 12, 1929.

1,705,288

UNITED STATES PATENT OFFICE.

WILLIAM S. GRAHAM, OF CANTON, ILLINOIS, ASSIGNOR TO INTERNATIONAL HARVESTER COMPANY, A CORPORATION OF NEW JERSEY.

TRACTOR CULTIVATOR ATTACHMENT.

Application filed January 24, 1927. Serial No. 162,980.

The present invention relates to tractor cultivators and more particularly to improvements in cultivator attachments intended for connection to tractors.

Four row attachments of the type having a frame or frames carried forwardly on the tractor and extending laterally beyond each side thereof for a considerable distance tend to impose excessive strains on the frame if its sole support is on the tractor. On the other hand, if the laterally extending frames are hinged on the tractor and are supported independently, as on a caster wheel, too great weight has to be carried by such a wheel to permit satisfactory operation of the cultivator organization on soft soils. Accordingly, the main object of this invention is to provide a structure in which the weight and strains heretofore either imposed wholly on the frame or too greatly centered on a caster wheel support will be so divided between such a frame and wheel as to obviate the difficulties referred to. Another object is to provide an arrangement of caster wheel support causing that wheel to also act as a depth gauge for certain of the cultivating tools. From a specific view point, an object of the invention is to provide a simple and practical form of extension attachment for tractor cultivators of the type shown in the patent to Benjamin et al. No. 1,539,108, May 26, 1925.

Other objects and advantages will become apparent from the following detailed description of the preferred embodiment of the invention.

Referring to the drawings:

Figure 2 is a similar side view; and

Figure 3 is a detail.

Figure 1:
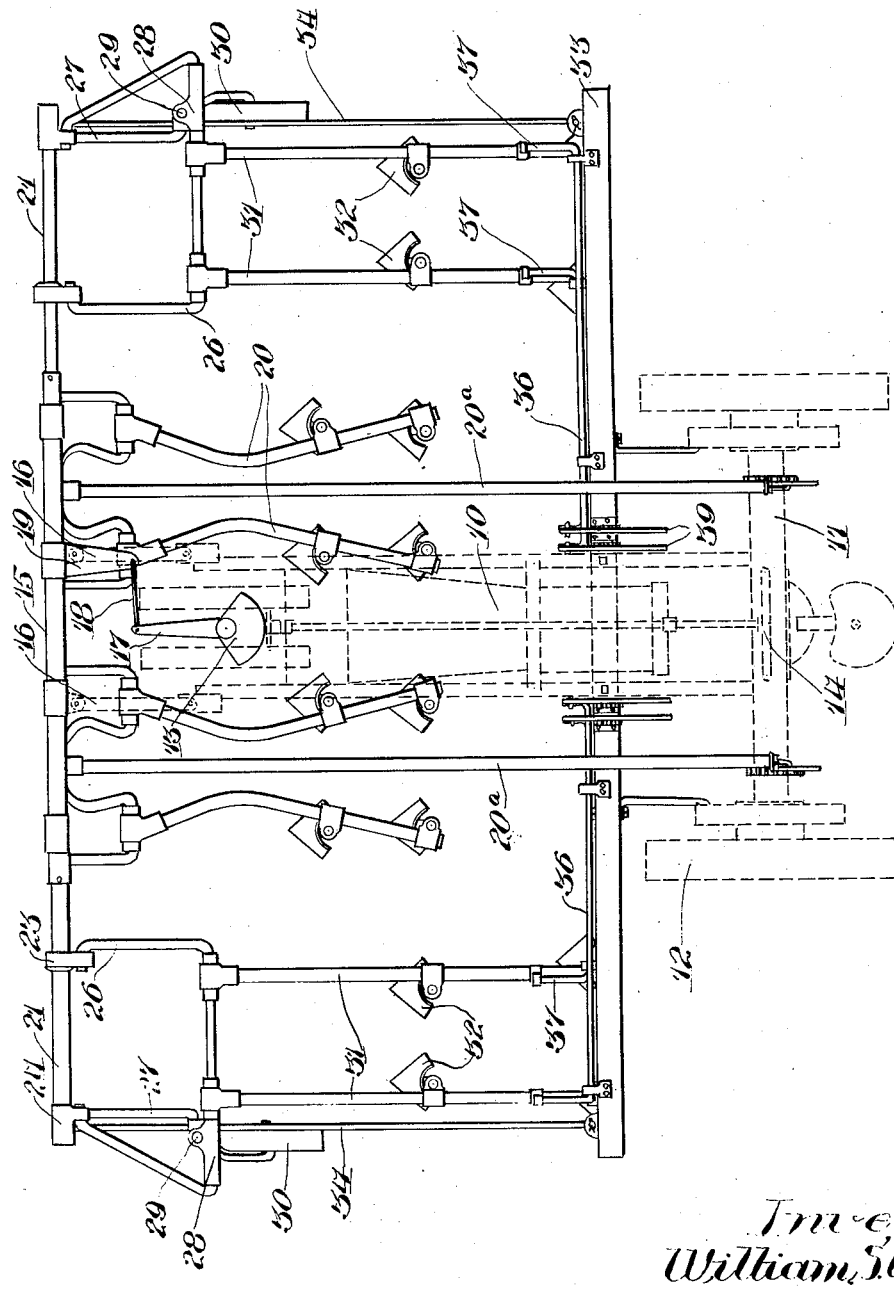
Figure 1 is a plan view of a four row tractor cultivator embodying the invention, the tractor proper being shown in dotted lines.

In its present embodiment the invention is shown in connection with a tractor comprising a longitudinally extending body 10 and a rear transversely extending axle structure 11 carried on widely spaced traction wheels 12. The wheels 12 are so spaced as to span two plant rows. The front of the tractor body 10 is supported on a steering truck 13 under control of a steering wheel 14 at the rear of the tractor. This tractor carries at its front a transversely extending frame member 15, which is so connected to the tractor, through pivotal supporting arms 16, as to be laterally shiftable with respect thereto through actuation by the steering movement of the truck, there being a connection between the steering truck and the member 15 consisting of an arm 17 fixed on the steering post of the truck and a link 18 connected to a bracket 19 on the member 15. The member 15 extends across the space spanned by the rear traction wheels and each end of said member carries a pair of cultivator beams 20, which are positioned to cultivate rows of plants within said space. The structure so far briefly described is substantially that of the tractor cultivator shown in the Benjamin et al. patent aforesaid and forms no part of the present invention except as it combines and cooperates therewith. The beams 20 are carried on arches pivotally hung on the bar 15 and have lifting and lowering means including bars 20$^a$ extending to levers on the rear axle of the tractor. In the preferred form of the present invention the main transverse frame member or cross bar 15 of the original tractor cultivator is equipped with extension bars 21 which project laterally at each side of the tractor beyond the tread of its wheels. The bar 15 is preferably tubular, as are the extension bars 21, and the preferred manner of connecting the two is to telescope one within the other as shown in Fig. 3, fastening bolts 22 passing through both bars to rigidly connect them. A rigid cross bar spanning a space corresponding to that ordinarily required for four plant rows is thus provided. Each extension bar 21 serves as the draft element or carrying means for an auxiliary structure including a pair of cultivator gangs and as the structures at each end of the main bar 15 are identical only one will be described.

Extension bar 21 has secured to it in properly spaced relation a pair of bearing brackets 23 and 24 having aligned transverse bearings or openings therein. The outer bracket 24 is also formed with a rigid depending bearing arm 25 (Fig. 2). Brackets 23, 24 have journaled therein the forward ends of a rearwardly extending bail member 26 and the lower end of arm 25 carries a pivoted link 27 extending in a plane parallel with the bail 26. The rear outer portion of bail 26 and the link 27 are held in parallel relation through pivotal connection with a vertical bearing socket 28 in which there is journaled the upright standard 29 of a caster wheel 30. There is thus provided a freely floating frame structure which trails from the bar 21 and is supported on a caster wheel which engages the ground at a point well back of the bar 21.

The transverse portion of the bail 26 has pivoted on it in properly spaced relation the front ends of a pair of cultivator beams 31 which trail therefrom and which carry the usual earth working tools such as shovels 32.

In order to properly brace the front cross bar and provide means for carrying part of the gang weight and working stresses, a second cross bar 33 is preferably mounted on the rear portion of the tractor at a point above the rear ends of the implement beams. This bar may be coextensive with the extended front cross bar and the ends of the two bars are preferably connected and braced by thrust bars 34, extending from the ends of cross bar 33 to the respective arms 25 on the front frame member. The cross bar 33 also serves as means for supporting the rear ends of the implement beams on the tractor, the connections between the cross bar and beams including means for regulating the working depth of the shovels and for raising and lowering the beams. In the preferred form this means consists of rock shafts 36 mounted in bearings on cross bar 33 and having outer ends formed with crank arms 37 connected by spring pressed links 38 to the respective implement beams. Shafts 36 have operative connections at their inner ends respectively, with hand levers 39 mounted on cross bar 33 at points convenient to the driver's station on the tractor. Obviously, one rock shaft may be used to control two or more of the beams if desired.

With the construction above described it will be seen that the organization as a whole provides a four row tractor cultivator characterized by having all four sets of gangs in full view of the operator's station on the tractor and by having an arrangement of parts providing for floating support of the outer pairs of gangs on frame elements carried by the tractor and with secondary support on ground engaging means acting also as gauge means for the implement carrying beams. The location of the caster wheels below the front ends of the implement beams and just in advance of the shovels is particularly advantageous in obtaining the gauging effect referred to.

It will also be evident that the invention includes means for readily converting a two row into a four row tractor cultivator without in any way altering the original two row machine.

While the above construction exemplifies a preferred form of the invention, it can obviously be modified without departure from the scope of the invention as defined in the following claims.

What is claimed is:

1. In combination, a vehicle provided with front and rear cross bars, a floating frame member extending rearwardly from the front cross bar and carried on a ground engaging support, a trailing implement beam connected to said frame member, and a supporting connection between said implement beam and the rear cross bar.

2. In combination, a vehicle provided with front and rear cross bars, a rearwardly extending bail pivoted for vertical movement on the front cross bar, a caster wheel supporting the bail, trailing implement beams having forward ends pivoted on the bail, and a supporting connection between the rear cross bar and the implement beams.

3. The combination with a tractor, of tillage means comprising a frame member extending across the forward portion of the tractor and projecting laterally beyond the tractor wheel tread, a wheel supported floating frame trailing from the projecting end of said frame member, earth working means connected to the floating frame, and depth adjusting means for the earth working means including actuating means mounted on the tractor.

4. The combination with a tractor, of tillage means comprising a frame member extending across the forward portion of the tractor and projecting laterally beyond the tractor wheel tread, a rearwardly extending floating frame pivoted on the projecting end of said frame member, a supporting caster wheel having a vertical standard swiveled on said frame, implement carrying beams pivoted on said frame and trailing therefrom, and depth adjusting means for the beams including actuating means carried on the tractor.

5. The combination with a tractor of tillage means comprising a frame member extending across the front of the tractor and projecting laterally beyond each side thereof beyond the tractor wheel treads, a wheel supported floating frame trailing from each projecting end of said frame member, implement carrying beams pivoted on said frames and trailing therefrom, a second frame member extending across the tractor and projecting laterally therefrom above the rear portions of said beams, and depth regulating means for the beams carried on said second frame member.

6. An auxiliary gang attachment for tractor cultivators having widely spaced rear traction wheels, a frame member extending across the front of the tractor and spanning the space between said wheels and cultivating tools carried by said frame member within said space; said attachment comprising a bar adapted to form a rigid extension of the frame member, a wheel supported floating frame trailing from said bar, cultivating tools having beams trailing from said frame, and depth regulating means for the tools including a support therefor adapted for connection to the tractor.

7. A four-row attachment for tractors of the type having rear traction wheels spaced to span two plant rows, said attachment comprising a rigid bar adapted to be mounted across the front end of a tractor, a second rigid bar adapted to be mounted across the rear portion of the tractor in parallel relation to the first bar, duplicate sets of row working implements trailing from the central portion of the first bar at positions coming within the traction wheel treads, floating frames trailing from each outer end of the first bar and supported on caster wheels, an outer set of row working implements having drag beams pivoted on each trailing frame, and vertically adjustable supports connecting each outer beam with the second crossbar.

In testimony whereof I affix my signature.

WILLIAM S. GRAHAM.